US009253754B2

(12) United States Patent
Sanderford, Jr.

(10) Patent No.: US 9,253,754 B2
(45) Date of Patent: Feb. 2, 2016

(54) MULTI-BAND CHANNEL CAPACITY FOR METER NETWORK

(75) Inventor: H. Britton Sanderford, Jr., New Orleans, LA (US)

(73) Assignee: Sensus USA Inc., Raleigh, NC (US)

( * ) Notice: Subject to any disclaimer, the term of this patent is extended or adjusted under 35 U.S.C. 154(b) by 0 days.

(21) Appl. No.: 13/333,226

(22) Filed: Dec. 21, 2011

(65) Prior Publication Data

US 2012/0163213 A1 Jun. 28, 2012

Related U.S. Application Data

(60) Provisional application No. 61/426,746, filed on Dec. 23, 2010.

(51) Int. Cl.
| | |
|---|---|
| H04W 72/02 | (2009.01) |
| H04W 24/00 | (2009.01) |
| H04W 28/16 | (2009.01) |
| H04W 40/12 | (2009.01) |
| H04Q 9/00 | (2006.01) |

(52) U.S. Cl.
CPC ......... *H04W 72/02* (2013.01); *H04Q 9/00* (2013.01); *H04Q 2209/25* (2013.01); *H04Q 2209/40* (2013.01); *H04Q 2209/60* (2013.01); *H04Q 2209/823* (2013.01); *H04W 24/00* (2013.01); *H04W 28/16* (2013.01); *H04W 40/12* (2013.01)

(58) Field of Classification Search
CPC ..... H04W 72/02; H04W 24/00; H04W 28/16; H04W 40/12; H04Q 9/00; H04Q 2209/40; H04Q 2209/60; H04Q 2209/823; H04Q 2209/25

See application file for complete search history.

(56) References Cited

U.S. PATENT DOCUMENTS

| 5,438,329 A | 8/1995 | Gastouniotis et al. |
| 5,883,886 A | 3/1999 | Eaton et al. |

(Continued)

FOREIGN PATENT DOCUMENTS

| DE | 42 13 783 C1 | 10/1993 |
| WO | 2006/0099598 A2 | 9/2006 |

OTHER PUBLICATIONS

PCT International Search Report dated Jan. 21, 2013.

(Continued)

*Primary Examiner* — Marsha D Banks Harold
*Assistant Examiner* — Walter Divito
(74) *Attorney, Agent, or Firm* — Andrus Intellectual Property Law, LLP

(57) ABSTRACT

A communication system that relays data messages from or to a plurality of remote endpoints via RF gateways to a data accumulation site over one of a series of communication channels. The communication system monitors the signal-to-noise ratio of communication from each individual endpoint, which can be utility meters and related control or monitoring points, to a gateway. Based upon a quality of service and/or the signal-to-noise ratio of the communication of the endpoints to the gateways, the system assigns a desired communication channel to the endpoint. Each of the desired communication channels have varying data transmission rate and required SNR and each channel is selected based upon the signal-to-noise ratio of the transmissions from the endpoint to the gateways. If the signal-to-noise ratio changes for an endpoint, the system dynamically reassigns a different channel to the meter based upon the updated signal-to-noise ratio.

8 Claims, 4 Drawing Sheets

(56) References Cited

U.S. PATENT DOCUMENTS

| | | |
|---|---|---|
| 7,457,588 B2* | 11/2008 | Love et al. ................. 455/67.11 |
| 2003/0169751 A1* | 9/2003 | Pulkka et al. ................. 370/401 |
| 2005/0003768 A1* | 1/2005 | Laroia et al. ................. 455/101 |
| 2006/0072491 A1* | 4/2006 | Simons ........................ 370/328 |
| 2006/0221847 A1* | 10/2006 | Dacosta ....................... 370/252 |
| 2007/0237210 A1* | 10/2007 | Voglewede et al. ........... 375/136 |
| 2008/0056199 A1* | 3/2008 | Park et al. ..................... 370/332 |
| 2008/0056211 A1* | 3/2008 | Kim et al. ..................... 370/338 |
| 2012/0092159 A1* | 4/2012 | Berezowski et al. .... 340/539.22 |

OTHER PUBLICATIONS

Chilean Patent Office Action received May 29, 2015.

* cited by examiner

MULTI-BAND CHANNEL CAPACITY FOR METER NETWORK

CROSS-REFERENCE TO RELATED APPLICATION

The present application is based on and claims priority to U.S. Provisional Patent Application Ser. No. 61/426,746 filed Dec. 23, 2010.

BACKGROUND OF THE INVENTION

The present disclosure generally relates to a method of controlling the radio communication of data messages between a plurality of field endpoints (in some cases utility meters) and a network of fixed location gateways which in turn communicate with a centrally located network controller. More specifically, the present disclosure relates to a method that optimizes the use of the communication channels by each of the plurality of endpoints to increase the overall effective message transmission capacity and where needed to increase the direct reach between a gateway and endpoint, thus enabling single-tier communications.

Presently, automated meter reading (AMR) systems exist that allow meters, such as electricity, gas and water meters, to communicate consumption information to a back end server through intermediate gateways. Typically, intermediate gateways communicate with the multiple meters using RF communication and re-transmit the received data over a public network, such as the internet. Although such systems, such as the FlexNet® AMI system available from Sensus USA, have proven effective at obtaining and processing meter data at a central, remote location, the increasingly common usage of such systems has increased the demand on the AMI or smart grid systems. As an example, in a system that includes 200 gateways and millions of individual meters, the communication taking place between the meters and the gateways has resulted in embodiments in which over 1 million messages are received by the gateways in aggregate per hour. Because of expanding applications, future smart grid systems are anticipated to exchange over 1 billion messages per day. Due to this increasingly high volume of communication between the meters and the gateways, techniques are required to more effectively utilize available bandwidth to enhance the communication between the various devices within the communication system. In addition, since real time control is required to protect the grid and to automatically respond to fault conditions, it is also important to minimize response time latency. This is also best accomplished by reducing the number of nodes where data must be handed off. Each hand-off requires that a node must receive a message, demodulate the message, apply error correction and possibly data decryption, repackage the message, set up the transmitter hardware and retransmit the messages, each step requiring processing time. Whereas mesh systems rely on multiple data hand offs between nodes, it is an object of this disclosure to minimize the number of handoffs thus improving latency. The minimal number of tiers is known to be one. Thus, an object of the disclosure is to provide reliable operation with a single communications tier.

Presently, when an individual meter is placed in a network system, the meter is assigned a communication channel over which communications between the meter and each of the gateways in the physical vicinity of the meter takes place. When an operator is setting up such a system, each meter is assigned a specific channel over which communication takes place. Although trained personnel attempt to select the communication channel based upon the proximity of the meter to a gateway or anticipated signal-to-noise ratio between the meter and a particular gateway, once the meter has been deployed, the communication channel frequency typically does not change unless the installer returns to reconfigure the meter or additional set-up is required at the network controller back-end. Therefore, although the operator may attempt to optimize the system upon deployment, if physical characteristics of the area change or if other variables are modified, the system will drop out of optimization, which is not desired.

SUMMARY OF THE INVENTION

The present disclosure relates to a system and method for controlling the communication of data between a multiplicity of endpoints (sometimes water gas or electricity meters, load controllers, PCT, utility displays, or the like) contained within a communication system and a single tier of intermediate gateways. The system optimizes the communication channel used to transmit the data between the meters and the gateways to ensure that each of the meters is transmitting data at the maximum rate while at the same time insuring a minimum "quality of service" and reliably, even to endpoints that in locations which are hard to reach and thus have lower signal to noise ratio (SNR).

During initial installation of meters in the communication system, each meter is initially assigned a default communication channel over which communications between the meter and the gateway will take place. The default communication channel is selected to have relatively long message duration since the signal-to-noise ratio between the meter and the gateway is initially unknown and the longer message duration improves link margin SNR.

After the meter has been installed into the communication system, the meter transmits communication messages between the meter and one or more gateways. In many cases, each of the meters will be able to communicate with more than one gateway of the communication system. The gateways are equipped with a means to measure signal quality. These means may include SNR, signal strength, quieting, or raw % message success or the like. The gateways forward this information to the central network controller.

After a series of messages are sent between each meter and the receiving gateways, the network controller analyzes the messages received by each of the gateways from each individual meter. Specifically, in the preferred embodiment the system determines the signal-to-noise ratio of the messages sent between the meters and the receiving gateways. The network controller also analyses raw % communications success and/or gaps in message delivery.

After a desired number of messages have been received, or a predetermined time has passed, the system determines the signal-to-noise ratio between each endpoint and the associated best receiving gateway. The best receiving gateway is the gateway that receives messages from the individual meter and has the highest signal-to-noise ratio.

Based upon the signal-to-noise ratio for the messages received at each of the gateways, the system determines whether the communication channel assigned to the meter is the most desirable. If the communication between the meter and the gateway has a relatively high signal-to-noise ratio, the system will assign a communication channel to the meter which is associated with high SNR meters. Preferably, the endpoint is programmable, by commands from the network controller, to communicate with a gateway or gateways over a plurality of different communication channels. The preferred embodiment of the disclosure typically uses sets of three gateway receive channels. The channels are distinguished by the type of endpoint which is assigned to them. High signal strength to best server endpoints are assigned to one channel, mid signal strength to best server endpoints are assigned to another channel and low SNR to best server endpoints are assigned to yet a third channel. In this manner, a weak SNR meter does not compete with a strong SNR meter, thus increasing noise, which reduces the reliability of the weak meter and reduces the SNR the weak meter would otherwise have available for communications.

In addition, the present disclosure teaches the use of higher order modulations when higher levels of SNR are available. It is known since the discovery of the "Shannon Bound" that SNR is related to the maximum data rate which can be sent for a given bit error rate (BER) reliability. Therefore, the preferred embodiment network controller commands an endpoint to utilize a modulation which conveys greater data rates, providing that the endpoint has demonstrated sufficient SNR to support that modulation. The instant disclosure uses N-FSK to accomplish this increase in data rates, where N is 2, 4, 8 and 16 and where the same bandwidth is used for each N. The instant disclosure is equally applicable to other modulations forms such as ASK, PSK etc. Therefore, for a given bandwidth, the effective data rate increases where the only cost is SNR. Each endpoint with a higher SNR effectively increases the overall capacity of the network since more messages can be delivered in a 24 hour period. Therefore, the preferred embodiment also segregates modulation methods by the frequency channel utilized. Each of the plurality of different communication channels has a resultingly different message duration and transmission rate. The low SNR channel, for example, cannot carry as much data capacity as the strong SNR channel. It is believed this is fundamentally optimal use of widely distributed SNRs from endpoints dynamically increases net effective message capacity while maintaining a minimum required quality of service (BER).

The communication channel assigned to each of the meters is determined based upon the signal-to-noise ratio between it and the best server TGB. If the signal-to-noise ratio is high, the system assigns the communication channel having the shortest message duration. Each of the communication channels includes an upper threshold value and a lower threshold value for the signal-to-noise ratio that should be present in order for the communication channel to be assigned to the meter.

During operation of the system, if the signal-to-noise ratio of messages transmitted by an individual meter to a gateway changes, the system re-assigns a communication channel based upon the adjusted signal-to-noise ratio. As an example, if the signal-to-noise ratio increases, the system will assign a communication channel having shorter message duration and increased transmission rate. Likewise, if the signal-to-noise ratio decreases, the system will select a communication channel having a lower communication rate and longer message duration. If the meter is already assigned the communication channel having the lowest communication rate and longest message duration, the system can optionally forward poll messages from a gateway and respond messages to the gateway via an intermediate endpoint that is equipped with store and forward capability.

In accordance with the present disclosure, the system assigns the communication channel to each of the individual meters based upon the signal-to-noise ratio of messages sent from the meter to the most optimal gateway. If the signal-to-noise ratio changes during use, the system will re-assign a communication channel based upon the adjusted signal-to-noise ratio.

Any channel on system may be used in a poll-respond fashion or in a "self-initiated" ALOHA fashion.

The present disclosure also describes two-way operation. The disclosure optionally controls the outbound RF power from a first gateway such that only enough power is used to reach the targeted endpoint. This conservation of RF power reduces the effect of the RF power on distant endpoint's receivers that are served by a second gateway closer to it, and not intended to hear the outbound message of the first gateway. The prior art describes many ways to provide power control which lead to a fair amount of complexity (such as that used by QUALCOMM which consumes channel capacity to provide real time control of an endpoints RF output power). The present disclosure uses a simple, predominantly static relationship: due to signal reciprocity, if the link margin from the endpoint to the gateway is strong then an inverse amount of power is required to communicate from the gateway to that endpoint. Therefore, when a poll message from a gateway is sent to that endpoint, it is transmitted at a reduced power. In addition, since the excess SNR is available, the poll message can be transmitted from the gateway at a higher data rate (as discussed above for the inbound messages to a gateway).

Further, the preferred employment assigns outbound channels, from a gateway to the endpoint, based on this inverse power relationship. In this manor all "strong" SNR endpoints listen on a channel that can optionally be set to a higher data rate modulation and yield a high quality of service even though the gateway transmits a lower amount of power. For example, if an endpoint has an excess of 20 db SNR above what is needed to demodulate the modulation it is set to, then the gateway can transmit 20 db less outbound power. This in effect reduces the effect of the gateway transmission on an endpoint that may be four times as distant.

The reduced outbound power allows for more frequency re-use, which increases overall network capacity, and the reduced noise increases available SNR to an endpoint's receiver thus increasing the quality of service delivered. Similar benefits accrue to low SNR endpoints such that a gateway may use a greater amount of outbound RF transmit power to communicate to a hard to reach meter, without having to use mesh-like intermediate tiers of communication. The present disclosure goes a step further, whereby the gateway is equipped with an additionally 10 dB of outbound power beyond that required for a balance from-to link margin. This allows a gateway to reach inside of a building to issue a poll message whereby an endpoint is able to reply to a gateway. Even if that polling gateway cannot hear the reply, in the preferred embodiment, all gateways listen on all frequencies at all time. Thus, a gateway that did not transmit the poll message may receive a reply from an endpoint and forward that reply to the network controller. This is particularly useful if a gateway should fail.

The present disclosure provides immediate seamless recovery, since any gateway may issue a poll message from an adjacent area next to the failed gateway and since any adjacent gateway may hear the reply. In addition, the network controller poll algorithm automatically increases a gateways transmitted RF power if an earlier poll transaction fails. In addition, the endpoints have several reply modes which a poll message can dynamically invoke. For example a poll that failed on a high SNR channel will be automatically resent by the network controller to reply on a low SNR modulation, thus reducing needed SNR and thus increasing the effective link margin. This is a very powerful method to dynamic insure a quality of service even when a gateway fails or another condition exists that may affect the signal paths of the network. For example, in the preferred embodiment, reducing a data rate from 25 kb/s to 4 kb/s can provide a dynamic link budget of 15 db utilizing the same signal bandwidth. Further reduction in data can provide an additional 10 db of link margin "reach." This feature is not feasible on a mesh network and helps to eliminate the need for multiple tiers and enables single tier operation.

It should be noted that the network controller may be part of a home network, a building network, a neighborhood, a city, a state or a country.

Various other features, objects and advantages of the invention will be made apparent from the following description taken together with the drawings.

BRIEF DESCRIPTION OF THE DRAWINGS

The drawings illustrate one mode presently contemplated of carrying out the disclosure. In the drawings.

DETAILED DESCRIPTION OF THE INVENTION

Figure 1:
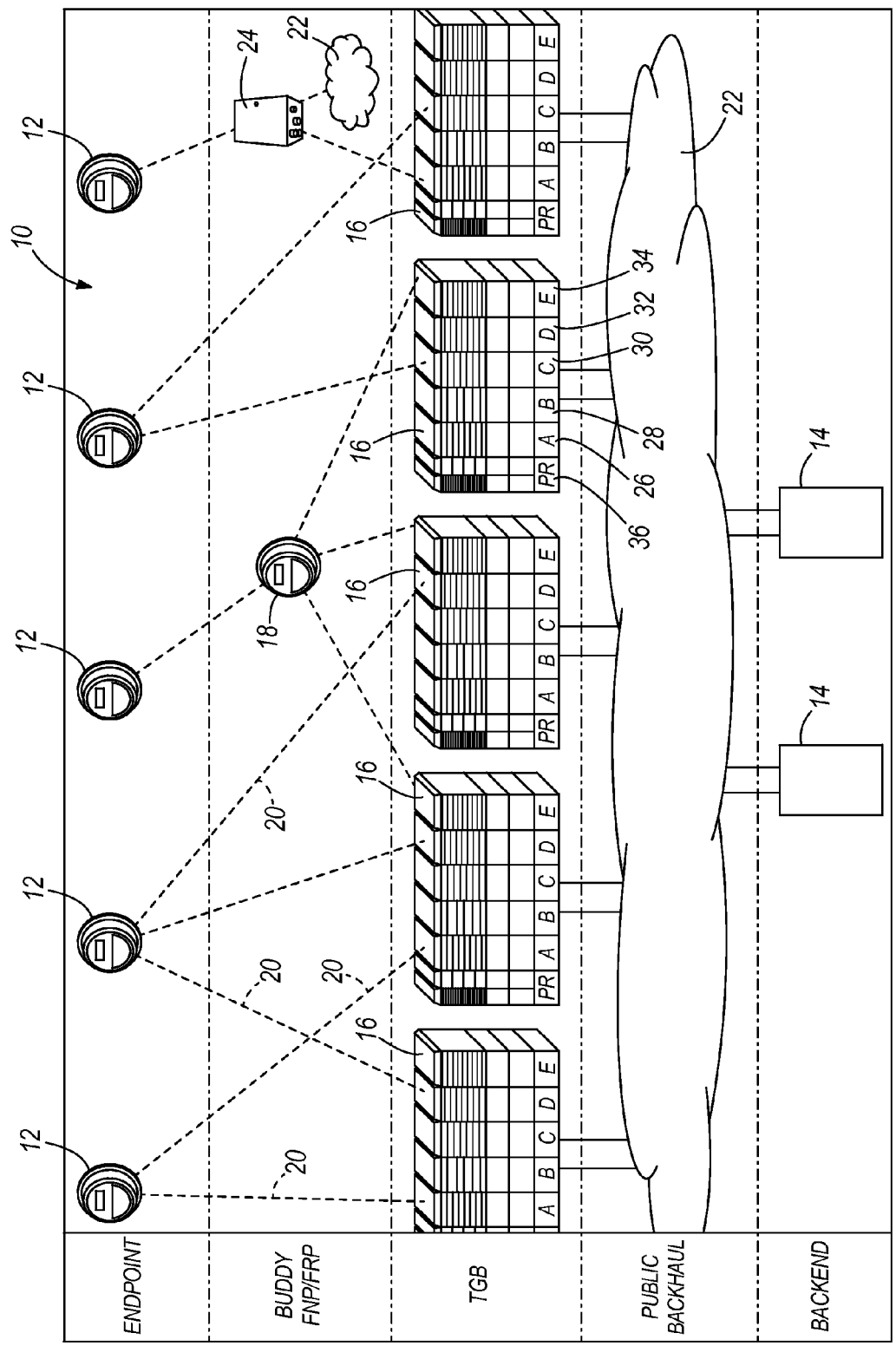
FIG. 1 is a schematic illustration of a communication system for relaying meter information from a plurality of meters to a back end data accumulator.

FIG. 1 illustrates a communication system 10 for communicating between a plurality of meters 12 and a back end data accumulation site or server 14. In the embodiment shown in FIG. 1, the meters 12 can be any type of utility meter, such as an electricity meter, gas meter, or water meter. The data accumulation server 14 can be located at a utility, third party data accumulation company or any other location that receives the accumulated meter data and processes the data for analysis, billing or any other purpose. The communication system 10 shown in FIG. 1 could be the FlexNet® communication system available from Sensus USA. However, other different types of communication systems are contemplated as being within the scope of the present disclosure.

In the embodiment shown in FIG. 1, each of the meters 12 communicates information either to one of a plurality of gateways 16 or to an intermediate meter 18. The intermediate meter 18 relays information from each of the end point meter 12 to one or more of the gateways 16. The intermediate meter 18 thus provides additional range of communication for each of the meters 12 that cannot communicate directly to one of the gateways 16.

As illustrated in FIG. 1, the communication between each of the meters 12 and one of the gateways occurs over one or more wireless communication paths 20. The wireless communication between the meter 12 and the gateway 16 occurs utilizing an RF data transmission signal.

Each of the gateways 16 in turn is able to communicate over a public wide area network (WAN) 22. In the embodiment shown, the public WAN 22 is the internet. Thus, each of the gateways 16 is able to communicate with the one or more data accumulation sites 14 through the public WAN 22, as is known.

In addition to the intermediate meters 18, the communication system 10 shown in FIG. 1 could also include a repeater 24 that can be used to either communicate information from the individual meter 12 through the gateway 16 or directly through the public WAN 22.

As illustrated in FIG. 1, each of the meters 12 preferably can communicate to more than one gateway 16 such that if one of the communication paths 20 to a gateway 16 is interrupted for any reason, the meter 12 can still communicate to another gateway 16. The redundant communication between each of the meters 12 and the gateways 16 facilitates a more robust and reliable communication system.

Although the system shown in FIG. 1 includes five individual gateways 16, it should be understood that in relatively large systems, the system could include dozens or hundreds of individual gateways 16, each of which serve multiple meters 12. FIG. 1 is a simplified illustration to facilitate understanding of the present disclosure.

In the schematic illustration shown in FIG. 1, the communication between the individual meters 12 and one or more of the gateways 16 can occur over one of five individual communication channels, illustrated by reference characters A-E in FIG. 1 and referred to by reference numerals 26-34. Each of the individual channels 26-34 may have slightly different communication protocols that enable the communication system 10 to optimize the communication between the individual meters 12 and the plurality of gateways 16. In addition to the five channels A-E, the communication system also includes a sixth channel 36 that is divided into two sub-channels. The channel 36 is the priority channel for reply communications from the gateways 16 to the meters as well as for priority or alarm communication between the meters and the gateway 16. The priority channel is shown by reference numeral 36 and reference characters PR in FIG. 1.

Figure 2:
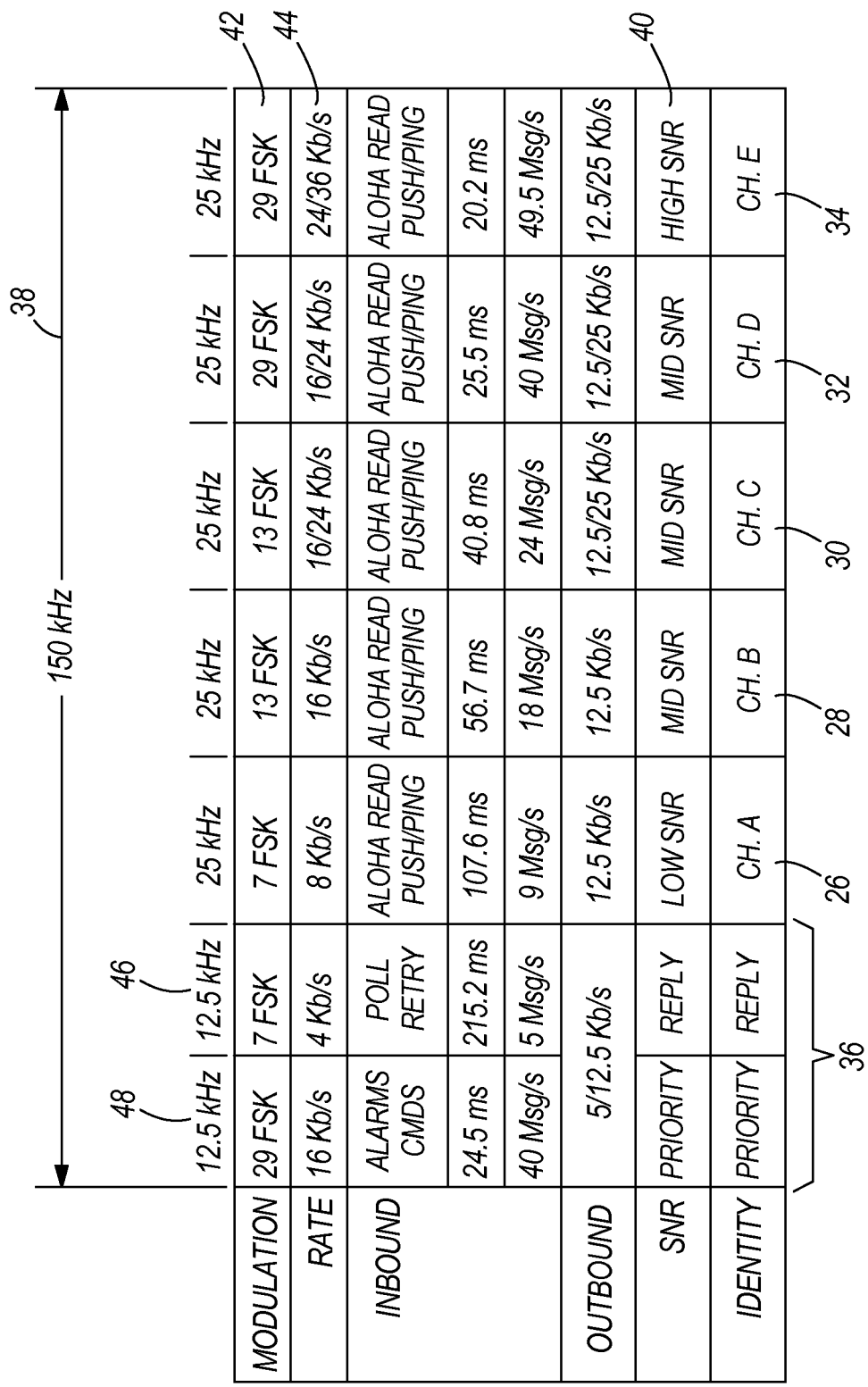
FIG. 2 is a schematic illustration of the individual channels used to communicate between the meters and intermediate gateways.

Referring now to FIG. 2, thereshown is a schematic illustration of each of the channels and the operating characteristics of each. Although specific properties are shown for each of the communication channels, it should be understood that the properties for each of the channels could be modified while operating within the scope of the present disclosure.

The communication bandwidth 38 is the entire bandwidth used for the communication between the individual meters 12 and the gateways 16. In the embodiment shown, the communication bandwidth 38 is 150 kHz. As described previously, the communication bandwidth 38 is divided into individual channels A-E as well as the priority channel 36. Each of the channels 26-34 has a bandwidth of 25 kHz.

During initial setup of the communication system, a control unit contained in each of the individual meters 12 is programmed to communicate with the gateway over the default channel 26. The meter 12 includes a transceiver in communication with the control unit to both send and receive messages using RF communication techniques. The control unit can be selectively programmed either locally or remotely using the RF communication. The control unit thus dictates the manner in which messages are transmitted from the meter 12.

Default channel 26 has a communication rate of 8 kb/s such that meters are able to communicate a message to one or more of the gateways in approximately 107.6 ms. At such rate, the gateway can receive nine messages per second. As illustrated in row 40, channel 26 is particularly desirable when the communication between the meter 12 and the gateway 16 has a low signal-to-noise ratio.

Communication channel 28 occupies the adjacent 25 kHz of bandwidth and has a different modulation technique, as shown in row 42. Channel 28 has a data transfer rate of 16 kb/s such that each individual message is transmitted in approximately 56.7 ms. At such a rate, the gateway can receive approximately eighteen messages per second. As can be understood in FIG. 2, if a meter is communicating over channel B rather than channel A, the time required to relay each individual message is substantially decreased. However, due to this decreased transmission time, any noise contained in the signal will have a greater effect. Thus, channel B is more applicable to transmissions that have a mid-level signal-to-noise ratio.

Communication channel C occupies the next 25 kHz and can have either a data transmission rate of 16 or 24 kb/s. At such rate, each message is transmitted for approximately 40.8 ms such that twenty-four messages per second can be received by each gateway. Once again, since the time required for each message to be sent is reduced, transmissions over channel C are more susceptible to noise. Thus, channel C is utilized when the communication between the meter and the individual gateway has a higher signal-to-noise ratio as compared to channels A or B.

Channel D occupies the next 25 kHz and again transmits data at either 16 or 24 kb/s. When a meter is relaying information along channel D, each message takes approximately 25.5 ms to complete. Again, since the time required to complete the message is reduced, the messages are more susceptible to noise. Once again, channel D is useful for messages that have a slightly higher signal-to-noise ratio as compared to channel C.

Finally, channel E is useful for communications in which the communications have the highest signal-to-noise ratio. Communications occurring over channel E take place at up to 36 kb/s such that each individual message is relayed in 20.2 ms. In such communication, 49.5 messages per second can be received by the gateway. The high signal-to-noise requirement by channel E indicates that communications over channel E are particularly desirable for meters that are physically close to the gateway or where the communication between the meter and the gateway is relatively unobstructed.

The priority channel 36 shown in FIG. 1 is broken down into two sub-channels, illustrated by reference numerals 46 and 48. The first sub-channel 46 is a reply channel used by each of the meters to reply to a polling request issued by any one of the gateways. The reply channel 46 occurs at a lower data transmission rate of 4 kb/s where each message takes approximately 215.2 ms to complete. Since the polling responses are used less frequently, the relatively long message duration is not as vital as with the other channels previously described.

The sub-channel 48 also occupies 12.5 kHz but instead uses a faster data transmission rate of 16 kb/s such that each message is received in 24.5 ms. Sub-channel 48 is utilized to relay alarm conditions and other urgent messages from the meter 12 to the gateway 16.

As can be understood by the above description of the channels used to convey messages between the meters 12 and the gateways 16, the selection of the individual channels moving to the right from channel 26 to the leftmost channel 34 decreases the amount of time required for each of the messages to be sent, which is generally desirable. However, due to this decreased time of transmission, the signal-to-noise ratio required to assure that messages are received correctly indicates that channel E should be utilized only with meters that have the highest signal-to-noise ratio while channel A should be utilized with those meters that transmit messages having a lower signal-to-noise ratio. The system of the present disclosure is configured to select over which channel communication should take place between each of the meters 12 and the gateways 16 in the manner to be described below.

Figure 3:
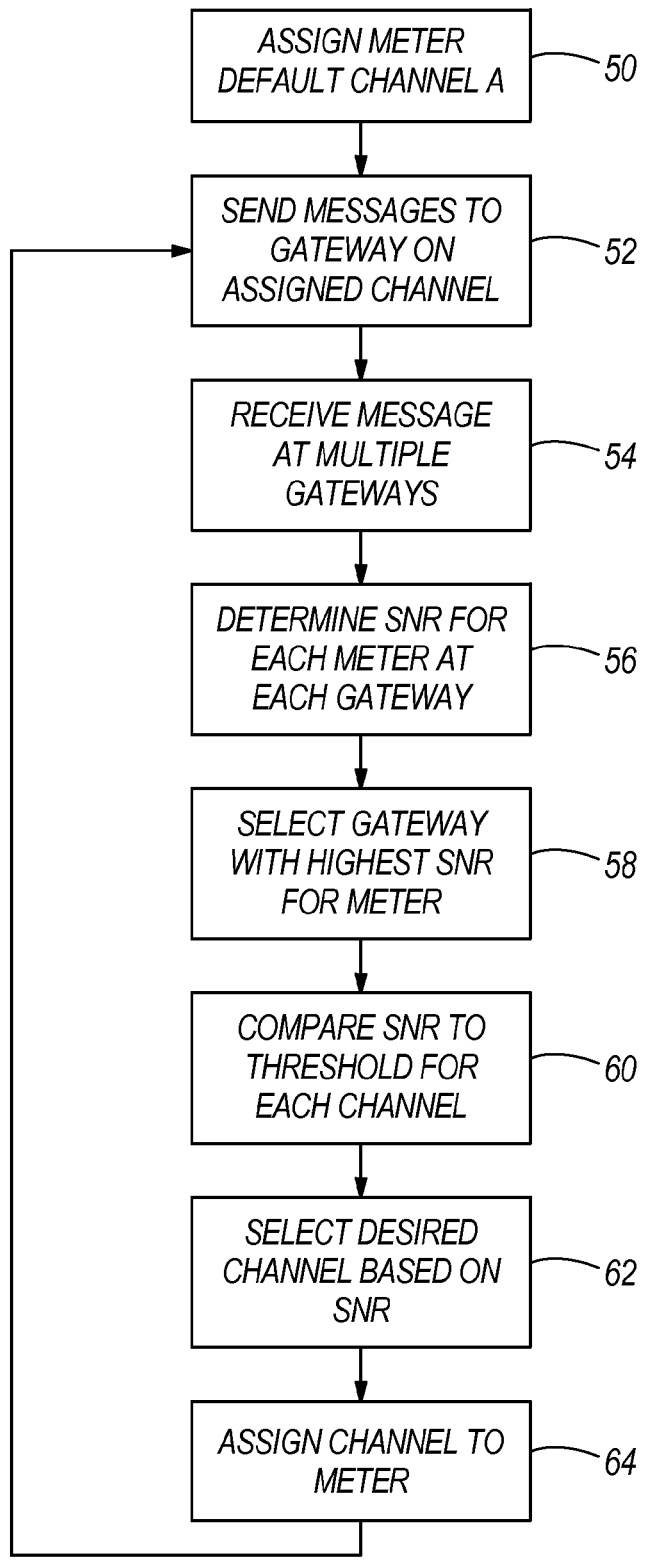
FIG. 3 is a flowchart describing one embodiment of the operation of the communication system.

Referring now to FIG. 3, when the system is initially set up, the control unit in each of the individual meters is configured to communicate the meter data to a gateway over default channel A, as illustrated by step 50. As described with reference to FIG. 2, channel A is a 25 kHz communication channel that has the longest message duration. The longer message duration ensures that the communication channel A is particularly desirable for communicating messages that have a low signal-to-noise ratio. Since channel A is the most robust and can handle transmissions having a relatively low SNR, channel A is assigned to each meter as a default.

Once the individual meter has been positioned within the communication system 10, the meter 12 transmits messages over the communication paths 20 shown in FIG. 1. The messages transmitted by each individual meter 12 may be received by multiple gateways, as also illustrated in FIG. 1. As shown in FIG. 3, each of the individual meters sends messages to the gateways in step 52 and one or more gateways receive the messages as illustrated in step 54.

When each gateway 16 receives a message, the gateway determines the signal-to-noise ratio for each message received from the meter. The signal-to-noise ratio is communicated along with the meter data to the data communication site 14 through the public WAN 22. The signal-to-noise ratio determined in step 56 is determined for each message received from the plurality of meters at each of the gateways 16 receiving the message. The signal-to-noise ratio is a measurement defined as the ratio of the signal power to the noise power that is corrupting the signal. The higher the signal-to-noise ratio, the higher the power of the signal is relative to the noise contained within the signal. Thus, when the signal-to-noise ratio is high, messages can be transmitted over a shorter period of time since the signal receiver is less likely to receive a corrupted signal.

Referring back to FIG. 1, when the data accumulation site 14 receives the data from each of the meters 12 through the gateway 16, the data accumulation site 14 can determine which gateway 16 received a message from each meter and determine which gateway 16 receives the message with the highest signal-to-noise ratio. As an illustrative example, the leftmost meter 12 shown in FIG. 1 communicates to the two leftmost gateways 16. Each gateway 16 relays the received message to the data accumulation site 14. The data accumulation site 14 can then determine which of the two gateways that receive the message from the leftmost meter 12 receives the message with the highest signal-to-noise ratio.

In step 58, the system selects the gateway 16 that has the highest signal-to-noise ratio for messages received from the meter 12.

Once the system determines which gateway 16 has the highest signal-to-noise ratio in step 58, the system can then average the signal-to-noise ratio over a defined period of time. The averaging of the signal-to-noise ratio over a period of time provides a more accurate signal-to-noise ratio calculation for the messages transmitted by the meters to the gateways.

Once the system selects the gateway with the highest signal-to-noise ratio, the system analyzes the signal-to-noise ratio for the data transmission from the meter to the gateway, as illustrated in step 60. The average signal-to-noise ratio is compared to an upper and lower threshold for each of the channels 26-34 shown in FIG. 2. Preferably, each of the channels 26-34 has a minimum threshold value and a maximum threshold value for the signal-to-noise ratio required for transmission over each of the channels. As previously described, since each of the channels has a decreasing message duration, it is important that the proper channel be selected for each individual meter.

Once the signal-to-noise ratio values have been compared to the various thresholds for each individual channel, the system selects a desired channel as illustrated in step 62. As previously described, the system attempts to select the channel having the lowest message duration based upon the signal-to-noise ratio calculated for communication from the meter to the gateway. Once the system selects the desired channel for the meter, the channel selection is communicated to the control unit of the meter. The desired channel is assigned to the meter in step 64. After the new channel has been assigned, the system returns to step 52 and the control unit contained in each of the individual meters begin to send messages to the gateways on the newly assigned channel. This process continuously repeats such that should the properties of the meter change or additional interference be introduced between the meter and the gateway, the meter can be updated to transmit information over a different channel.

In the embodiment shown in FIG. 3, it is contemplated that the comparison of the SNR to the threshold for each channel, as illustrated in step 60, may occur at only a desired interval. As an example, step 60 may occur only once a day. Thus, a new channel would not be assigned to a meter more than one time a day to reduce the complexity of the system operation. Since the physical configuration of the meters and the interference positioned between the meters and the gateway will change infrequently, it has been found that changes to the channel assigned to a meter occurs in only less than 1% of the meters on a daily basis. However, the system operating in accordance with the present disclosure allows the configuration of each individual meter to be automatically adjusted should any changes occur in the interference between the meters and the gateways.

If the system determines in step 60 that the signal-to-noise ratio is below the lowest threshold for channel A shown in FIG. 2, the system then determines that the individual meter is unable to communicate directly to a gateway 16. In such situation, the control unit of each individual meter can then be configured to communicate with one of the intermediate meters 18 shown in FIG. 1.

As described with reference to FIG. 3, if the system determines that the signal-to-noise ratio of the communication of the meter to the most desirable gateway is greater than the threshold value for the current channel assigned to the meter, the system moves the meter to one of the channels to the left of the current channel shown in FIG. 2. The movement of the assigned channel to the right in FIG. 2 increases the baud rate, decreases the message transmission time and thus enhances the operation of the system by moving meters to the most desirable channel. If the meter was previously assigned to communicate through an intermediate meter 18, the meter may be reconfigured to communicate directly to one of the gateways 16.

Alternatively, if the system determines in step 60 that the current channel assigned to the meter is above the signal-to-noise ratio for the meter, the system moves the assigned channel to the meter left with reference to FIG. 2 to decrease the baud rate and increase the message transmission time. If the meter is already in channel A, the system then reconfigures the meter into a "buddy" mode in which the meter communicate to one of the intermediate meters 18 rather than directly to the gateway 16.

Strong Meter Case

Figure 4:
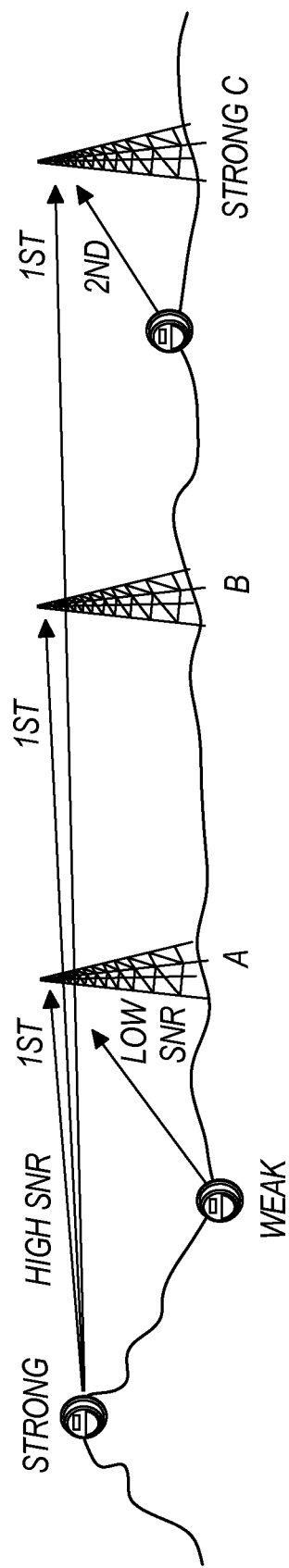
FIG. 4 is a graphic illustration of the strong and weak communication between meters and a receiving tower.

FIG. 4 illustrates an implementation in which three representative meters are illustrated in a system having three towers, A, B and C. The transmission area for each meter is determined by the equation $\pi R^2$, where the radius R is the distance from the meter. Therefore, if all three of the towers A, B and C are within the transmission radius of the strong meter, then approximately 27 towers will be affected by some level of signal strength. Prior art systems reduce this effect by utilizing power control at the endpoint and attempting to normalize power received at any given tower (QUAL-COMM). This uses up control channel bandwidth and in fact reduces signal redundancy at a distant tower when no data collision would have occurred.

The present disclosure avoids loss of the intended message during on-air collisions by continually monitoring receive power level, or the like, during the reception of a message. If a colliding message occurs before the initial message was complete and the colliding message had a signal level with sufficient C to I for demodulation, then the reserve 'aborts' the first message and attempts to demodulate the second. In one embodiment, two DSP demodulators will attempt to simultaneously demodulate the first and the second colliding messages and utilize the message CRC or convolution encoding of encryption to validate which message was successful.

Weak Meter Case

The weak meter will always be at a disadvantage to the strong and mid SNR meters which will always win the collisions due to higher C to I and abort. To normalize these statistics in the weak endpoint case, the endpoint with a weak SNR, even to their best server tower, is placed on a separate channel, where only other weak SNR meters compete. In an ALOHA system with no time reference, this will yield non-slotted performance, except in cases of collisions between endpoints which experience a common level of fading, 10-15 dB. If one signal is faded such to provide a useful C to I for the endpoint to demodulate, the abort feature can bring the ALOHA performance up to slotted, even without a timing signal.

Minimum channels used in this method are one low SNR and one high SNR. As described previously, it is contemplated that the data accumulation site 14 will optimize the endpoint configuration on a daily basis. Further, it is contemplated that even during the reconfiguration, less than 1% of the meters will be reconfigured based upon the change to the signal-to-noise ratio.

I claim:

1. A method of selecting a communication channel for each meter of a plurality of meters in a communication system including a plurality of gateways that each communicate to a back end server, the method comprising the steps of:
    defining a plurality of communication channels in a continuous sequence between a first communication channel and a last communication channel, wherein the plurality of communication channels have increasing transmission rates and decreasing message durations from the first communication channel to the last communication channel;
    initially assigning a default communication channel to each of the plurality of meters;
    relaying a plurality of messages from each of the meters along the default communication channel;
    determining the signal-to-noise ratio of the messages received at each of the gateways for each of the plurality of meters;
    selecting one of the plurality of communication channels for each of the meters to optimize the modulation rate and message duration based upon the highest signal-to-noise ratio at one of the gateways for the plurality of message sent by the plurality of meters; and assigning the selected communication channel to each of the plurality of meters, wherein the communication channels are assigned to the plurality of meters such that the plurality of meters are distributed across all of the plurality of communication channels such that at least one of the plurality of meters is assigned to each of the plurality of communication channels, where tri-band operation is used such that the number of channels assigned is three where a first channel is assigned only endpoints having signal to noise ratio (SNR) to its best link margin gateway is low, and where a second channel is assigned only endpoints having a SNR to its best link margin gateway is medium, and where a third channel is assigned only endpoints having a SNR to its best link margin gateway is high.

2. The method of claim 1 where the first, second and third SNR channels are assigned endpoint traffic in a manor to normalize the total on-time or duty cycle of traffic such that the traffic is evenly spread.

3. The method of claim 1 where the first, second and third SNR channels are assigned endpoint traffic in a manor to normalize the total on-time or duty cycle of traffic such that the traffic is maximized into the high channel since more messages can be transacted per unit time.

4. The method of claim 1 wherein the default communication channel has a default modulation rate and a default message duration.

5. The method of claim 1 wherein at least one of the plurality of communication channels is defined as a priority channel, wherein each of the plurality of meters selectively communicates over the priority channel in addition to the communication channel assigned to the meter.

6. The method of claim 5 wherein the priority channel includes both an alarm sub-channel and a reply sub-channel.

7. The method of claim 6 wherein alarm messages are relayed to each of the plurality of meters over the alarm sub-channel and replies are communicated from each of the plurality of meters over the reply sub-channel.

8. The method of claim 1 wherein the plurality of meters are distributed into each of the plurality of communication channels such that meters having similar signal-to-noise ratios are assigned to the same communication channel.

\* \* \* \* \*